US011460235B1

(12) United States Patent
Hunter et al.

(10) Patent No.: US 11,460,235 B1
(45) Date of Patent: Oct. 4, 2022

(54) SUPPORT ASSEMBLY FOR AN INSULATED STRUCTURE

(71) Applicant: WHIRLPOOL CORPORATION, Benton Harbor, MI (US)

(72) Inventors: Lynne F. Hunter, Dorr, MI (US); Narendra Ashok Kapure, Pune (IN); Abhay Naik, Stevensville, MI (US); Manjunathraddi Navalgund, Pune (IN); Sanket Vivek Phalak, Pune (IN)

(73) Assignee: Whirlpool Corporation, Benton Harbor, MI (US)

( * ) Notice: Subject to any disclaimer, the term of this patent is extended or adjusted under 35 U.S.C. 154(b) by 0 days.

(21) Appl. No.: 17/220,130

(22) Filed: Apr. 1, 2021

(51) Int. Cl.
*F25D 23/00* (2006.01)
*F25D 23/06* (2006.01)

(52) U.S. Cl.
CPC ......... *F25D 23/006* (2013.01); *F25D 23/066* (2013.01); *F25D 2201/14* (2013.01)

(58) Field of Classification Search
CPC .................................................. F25D 23/006
See application file for complete search history.

(56) References Cited

U.S. PATENT DOCUMENTS

| 3,948,410 A | 4/1976 | Anderson |
| 3,995,922 A * | 12/1976 | Ohashi ................. F25D 23/063 312/265.5 |
| 4,586,348 A | 5/1986 | Nakayama et al. |
| 4,932,729 A | 6/1990 | Thompson et al. |
| 6,773,082 B2 | 8/2004 | Lee |
| 8,500,225 B2 | 8/2013 | Kim et al. |
| 9,285,157 B2 * | 3/2016 | Selin ....................... F25D 19/00 |
| 9,791,202 B2 | 10/2017 | Horio et al. |
| 9,970,704 B2 | 5/2018 | Joo et al. |
| 10,215,476 B2 | 2/2019 | Bajak et al. |
| 10,274,247 B2 | 4/2019 | Jeong et al. |
| 2003/0141793 A1* | 7/2003 | Lee ....................... F25D 23/063 312/401 |
| 2005/0045457 A1 | 3/2005 | Park |
| 2012/0285971 A1 | 11/2012 | Junge et al. |
| 2015/0192351 A1 | 7/2015 | Kang et al. |
| 2015/0292791 A1* | 10/2015 | Lokhande ................ F16M 5/00 248/346.03 |

(Continued)

FOREIGN PATENT DOCUMENTS

| CN | 106679308 A | 5/2017 |
| JP | 6448984 B2 | 1/2019 |

(Continued)

*Primary Examiner* — Daniel J Rohrhoff
(74) *Attorney, Agent, or Firm* — Price Heneveld LLP

(57) ABSTRACT

A support assembly for a vacuum insulated structure includes a base plate that has a perimeter support surface and centrally defines an aperture. The base plate includes fasteners that extend outwardly from the base plate. Base rails each include a support body that has a first attachment flange, a second attachment flange, and a mounting wall that is operably coupled to the support body. The first attachment flange and the second attachment flange operably couple each of the base rails to the base plate. A front plate is operably coupled to the mounting wall of each of the base rails. A machine plate is operably coupled to each of the first attachment flange and the second attachment flange of each of the base rails proximate to the base plate.

17 Claims, 7 Drawing Sheets

(56) References Cited

U.S. PATENT DOCUMENTS

| | | | | |
|---|---|---|---|---|
| 2018/0017314 A1* | 1/2018 | Jeong | ................... | F25D 23/061 |
| 2021/0140703 A1* | 5/2021 | Wong | ................... | F25D 23/062 |

FOREIGN PATENT DOCUMENTS

| | | | |
|---|---|---|---|
| JP | 2019032161 A | | 2/2019 |
| WO | 9913280 A1 | | 3/1999 |
| WO | WO-2021161239 A1 | * | 8/2021 |

* cited by examiner

SUPPORT ASSEMBLY FOR AN INSULATED STRUCTURE

BACKGROUND OF THE DISCLOSURE

The present disclosure generally relates to an insulated structure for an appliance, and more specifically, to a support assembly for an insulated structure.

SUMMARY OF THE DISCLOSURE

According to one aspect of the present disclosure, a vacuum insulated structure includes a wrapper that has a bottom surface. A liner is operably coupled to the wrapper and defines an insulation cavity that includes materials. A machine compartment is at least partially defined by the wrapper. A base plate is operably coupled to the bottom surface of the wrapper proximate the machine compartment. Base rails are operably coupled to the base plate and at least partially defines the machine compartment. Each of the base rails include attachment flanges and a mounting wall. A machine plate is operably coupled to the base rails and define a lower portion of the machine compartment.

According to another aspect of the present disclosure, an insulated structure for an appliance includes a wrapper. A liner is operably coupled to the wrapper. A base plate has a first surface and a second surface. The base plate is operably coupled to the wrapper via the first surface and is configured to distribute a load of the wrapper and the liner. Base rails are operably coupled to the second surface of the base plate. Each of the base rails include a first attachment flange, a second attachment flange, and a mounting wall. A machine compartment is defined by the wrapper and the base rails proximate to the base plate. A machine plate is operably coupled to the first attachment flange and the second attachment flange of each of the base rails and define a lower portion of the machine compartment.

According to yet another aspect of the present disclosure, a support assembly for a vacuum insulated structure includes a base plate that has a perimeter support surface and centrally defines an aperture. The base plate includes fasteners that extend outwardly from the base plate. Base rails each include a support body that has a first attachment flange, a second attachment flange, and a mounting wall that is operably coupled to the support body. The first attachment flange and the second attachment flange operably couple each of the base rails to the base plate. A front plate is operably coupled to the mounting wall of each of the base rails. A machine plate is operably coupled to each of the first attachment flange and the second attachment flange of each of the base rails proximate to the base plate.

These and other features, advantages, and objects of the present disclosure will be further understood and appreciated by those skilled in the art by reference to the following specification, claims, and appended drawings.

Figure 1:
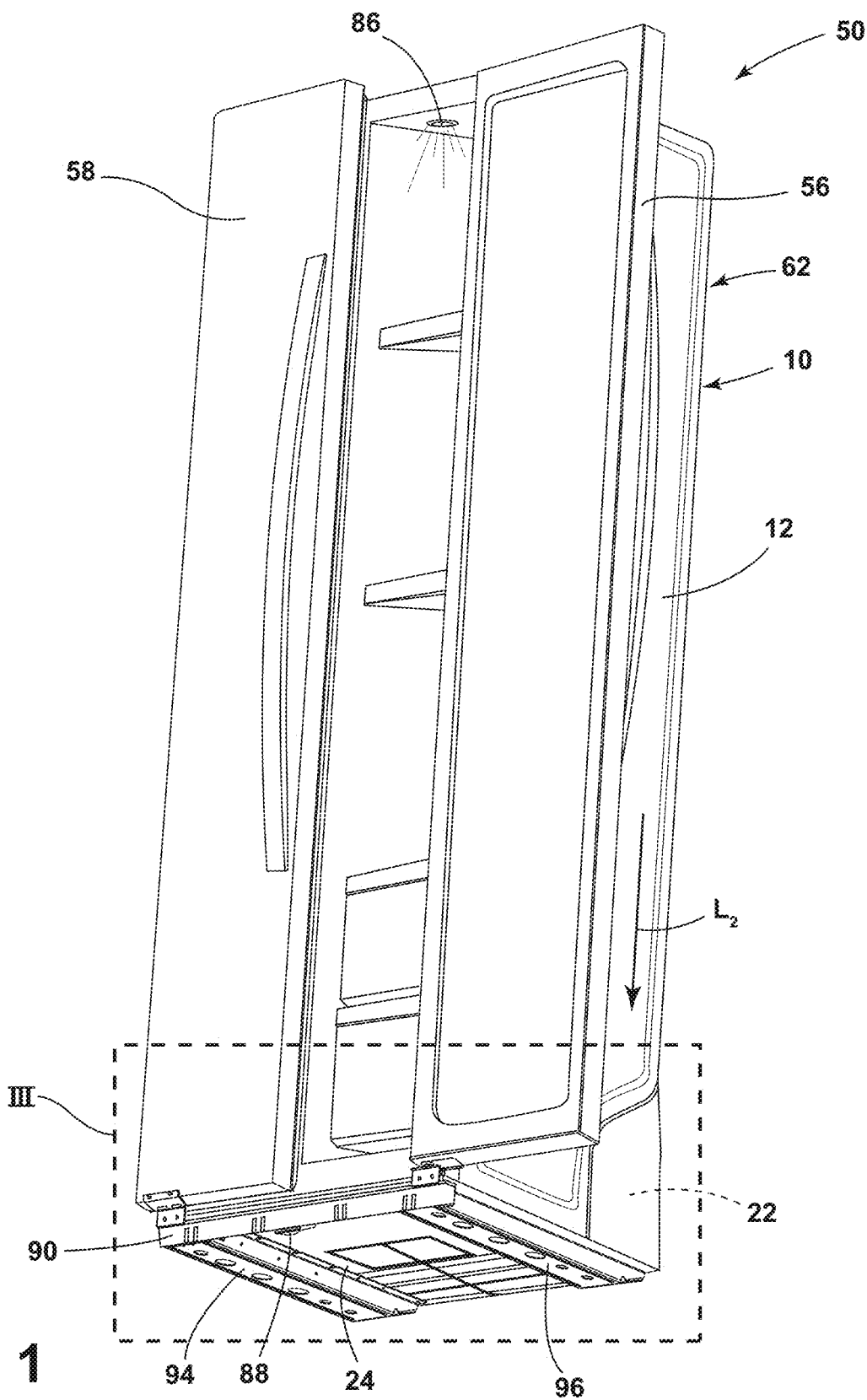
FIG. 1 is a bottom perspective view of an appliance with base rails of the present disclosure.

The components in the figures are not necessarily to scale, emphasis instead being placed upon illustrating the principles described herein.

DETAILED DESCRIPTION

The present illustrated embodiments reside primarily in combinations of method steps and apparatus components related to a support assembly. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

For purposes of description herein, the terms "upper," "lower," "right," "left," "rear," "front," "vertical," "horizontal," and derivatives thereof shall relate to the disclosure as oriented in FIG. 1. Unless stated otherwise, the term "front" shall refer to the surface of the element closer to an intended viewer, and the term "rear" shall refer to the surface of the element further from the intended viewer. However, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The terms "including," "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises a . . . " does not, without more constraints, preclude the existence of additional identical elements in the process, method, article, or apparatus that comprises the element.

Referring to FIGS. 1-8, reference numeral 10 generally designates a vacuum insulated structure that includes a wrapper 12. The wrapper 12 has a bottom surface 14, and a liner 16 is operably coupled to the wrapper 12. The liner 16 defines an insulation cavity 18 that includes insulation materials 20. A machine compartment 22 is at least partially defined by the wrapper 12. A base plate 24 is operably coupled to the bottom surface 14 of the wrapper 12 proximate to the machine compartment 22. Base rails 26 are operably coupled to the base plate 24. The base rails 26 at least partially define the machine compartment 22, and each of the base rails 26 includes attachment flanges 28 and a mounting wall 30. A machine plate 32 is operably coupled to the base rails 26 and defines a lower portion 34 of the machine compartment 22.

Figure 2:
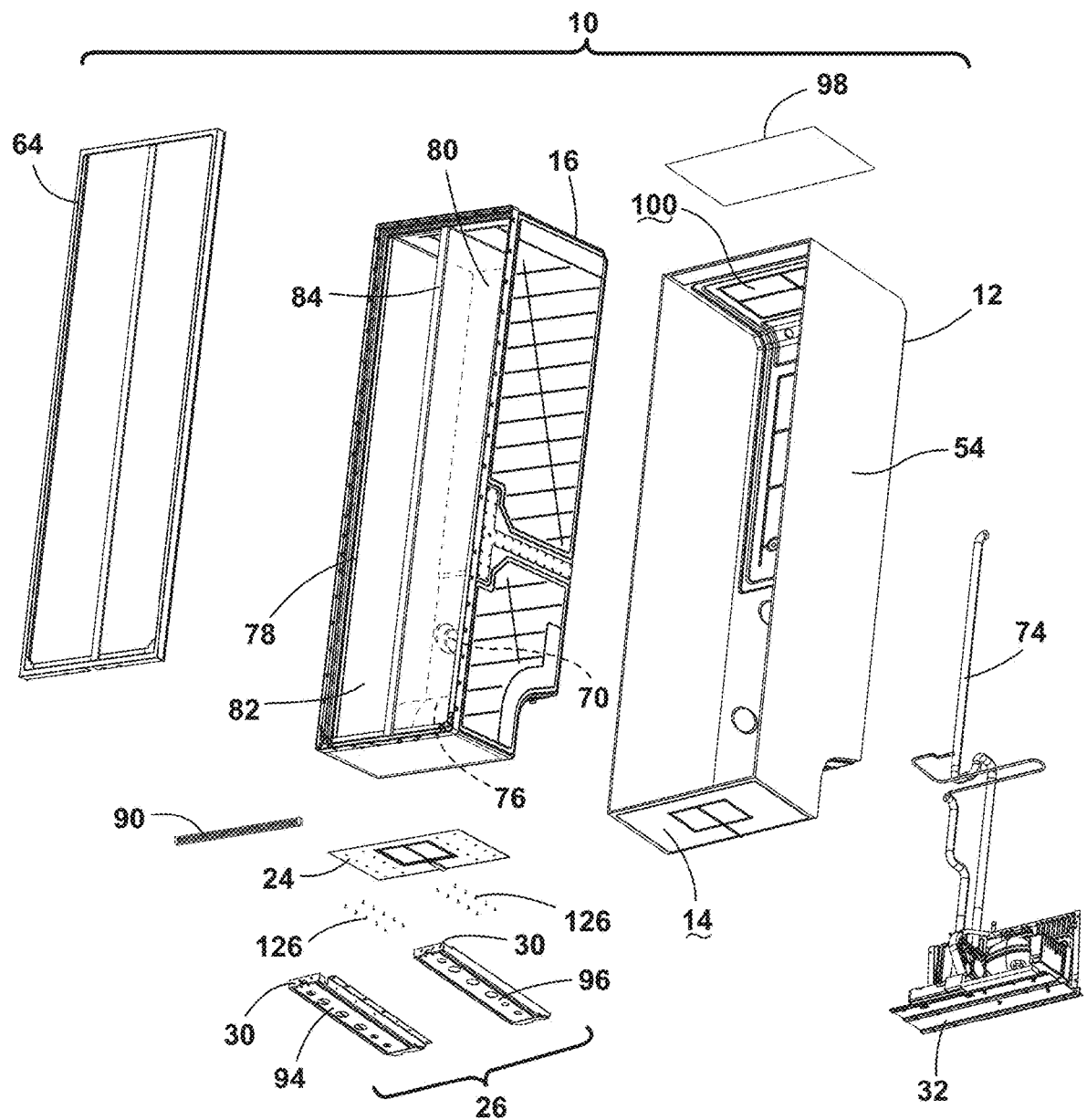
FIG. 2 is an exploded bottom perspective view of an insulated structure of the present disclosure
Figure 3:
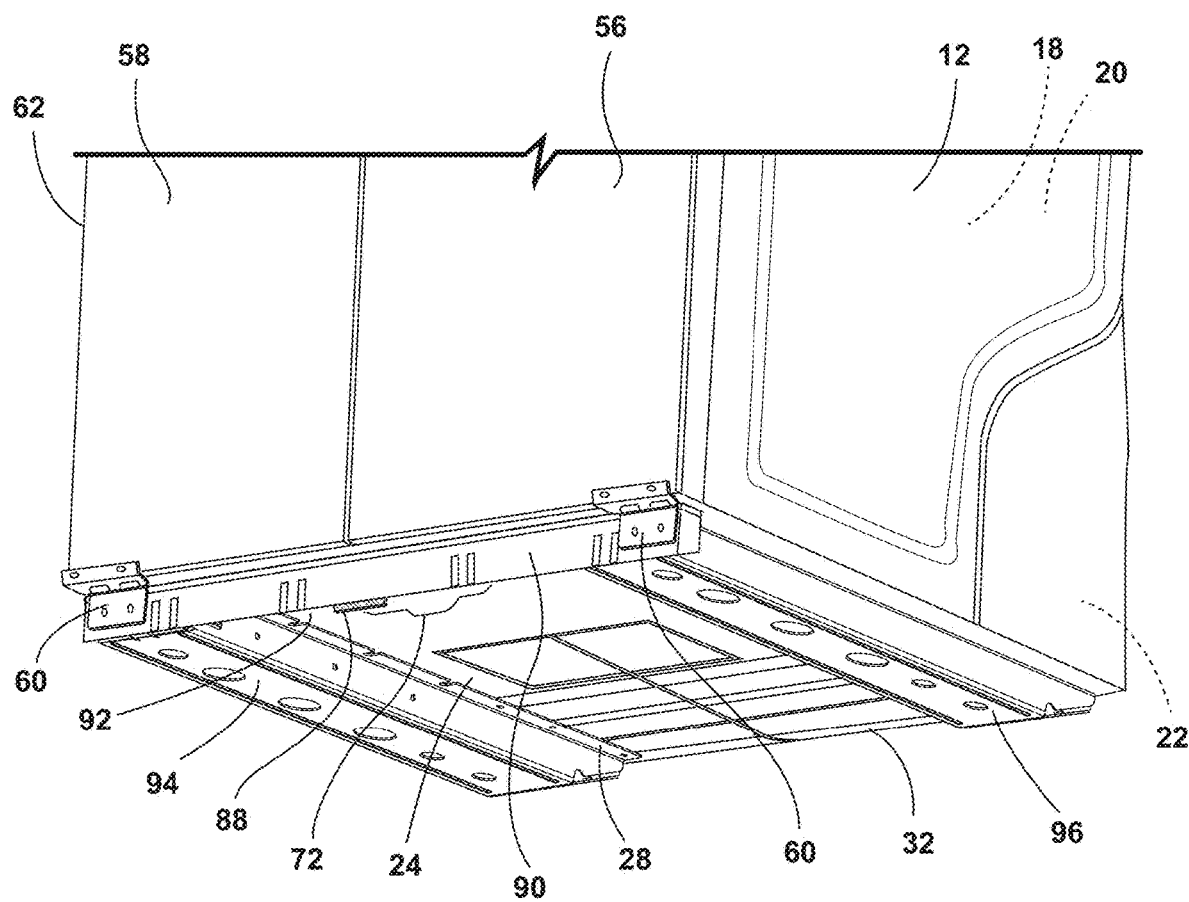
FIG. 3 is an enlarged bottom perspective view of the appliance and base rails of FIG. 1 taken at area III.
Figure 4A:
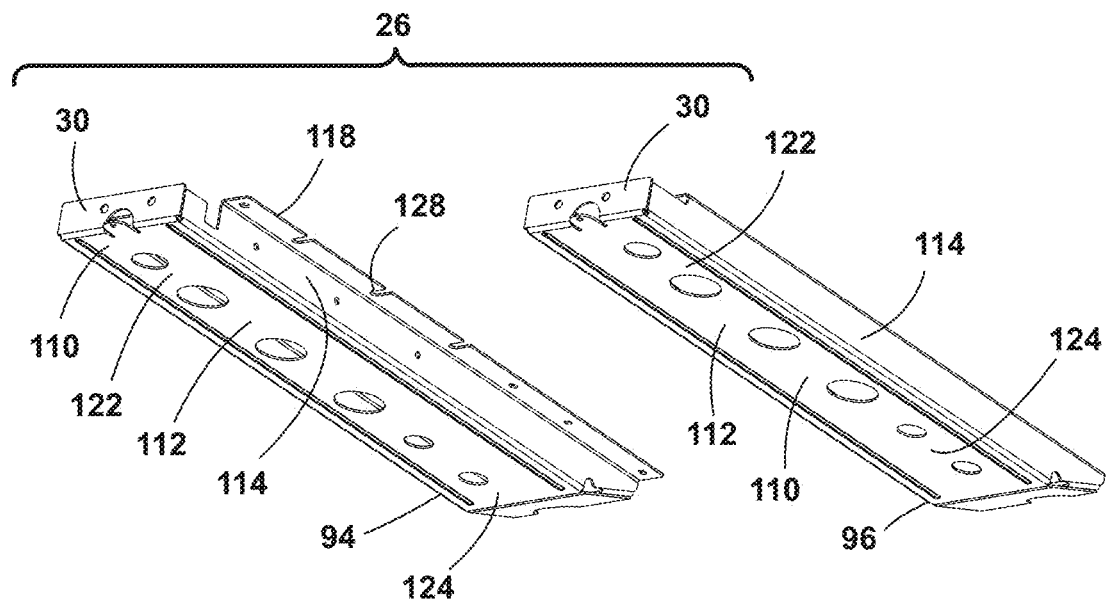
FIG. 4A is a top perspective view of a first rail and a second rail of base rails of the present disclosure having a first attachment flange and a second attachment flange.
Figure 4B:
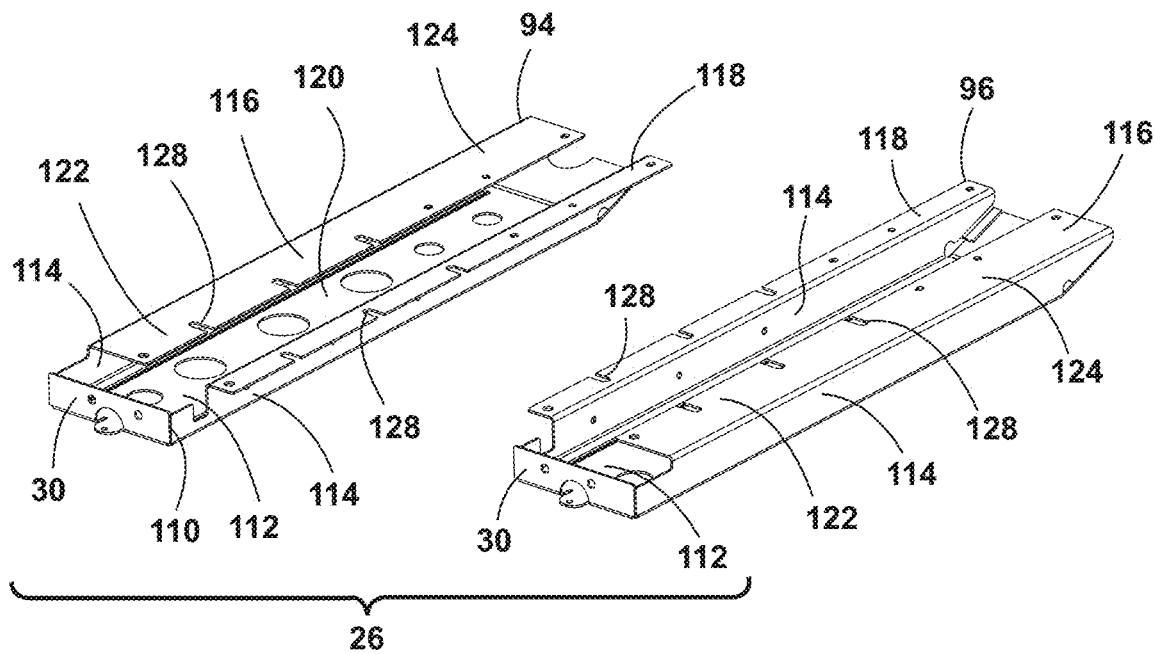
FIG. 4B is a bottom perspective view of the first rail and the second rail of the base rails of FIG. 4A.

Referring to FIGS. 1-3, the vacuum insulated structure 10 is illustrated as being part of a refrigerating appliance 50, but it is also contemplated that the vacuum insulated structure 10 described herein may be used with a variety of appliances. The refrigerating appliance 50, referred to as the appliance herein, is illustrated as a built-in appliance, such that a rear wall 52 and sidewalls 54 of the wrapper 12 may be generally exposed. The appliance 50 includes first and second doors 56, 58 operably coupled to the appliance 50 via hinges 60, described further below. It is generally contemplated that the wrapper 12 and the liner 16 generally form a cabinet 62, which may define the vacuum insulated structure 10. The wrapper 12 and the liner 16 may be formed from metals, polymers, metal alloys, combinations thereof, and other suitably rigid materials that can be used for vacuum insulated structures within appliances. The cabinet 62 defined by the wrapper 12 and the liner 16 may incorporate the vacuum insulated structure 10, such that the cabinet 62 is equivalent to the vacuum insulated structure 10. Stated differently, the cabinet 62 may be an insulated structure that incorporates the insulation materials 20 as described above.

The liner 16 and the wrapper 12 are typically coupled to a trim breaker 64 to form the vacuum insulated structure 10. It is generally contemplated that the trim breaker 64 may be formed from glass, plastic, metal, or other materials suitable for retaining a vacuum defined between the wrapper 12 and the liner 16 within the insulation cavity 18. It is also contemplated that the liner 16 and the wrapper 12 are operably coupled to the trim breaker 64 via an adhesive material that may be configured with materials, such as glass or other generally insulating materials, to minimize outgassing of the insulation cavity 18. The liner 16 and the wrapper 12 also define the insulation cavity 18 therebetween in which one or more of the insulation materials 20 may be disposed. It is generally contemplated that the insulation materials 20 may be a glass type material, a carbon-based powder, silicone oxide-based materials, insulating gases, and other standard insulation materials 20 known in the art. The insulation materials 20 substantially fill the insulation cavity 18 to form a substantially continuous layer between the liner 16 and the wrapper 12. The insulation cavity 18 is evacuated to define the vacuum insulated structure 10.

With further reference to FIGS. 1-3, holes 70 are defined by the wrapper 12 and the liner 16 to provide a passage for electrical wiring 72 and other typical appliance lines 74. For example, when the appliance 50 is a refrigerator and/or freezer, the appliance lines 74 configured to direct water are connected to the appliance 50 and may pass through the holes 70 toward the machine compartment 22, described further below. Typically, the openings 78 are defined along at least the rear wall 52 of the wrapper 12. The holes 70 may also be defined by a rear panel 76 of the liner 16, which is disposed within the wrapper 12 to define the vacuum insulated structure 10, as mentioned above. The liner 16 also defines at least one opening 78 that may correspond to an appliance compartment. By way of example, not limitation, the at least one opening 78 can include a first opening 80 that corresponds to a refrigeration compartment and a second opening 82 that corresponds to a freezer compartment with a mullion 84 disposed therebetween. In such configuration, the liner 16 is generally divided, at least in part, by the mullion 84 to define the first and second openings 80, 82. For purposes of this disclosure, the first and second openings 80, 82 are illustrated as being divided by a vertically oriented mullion 84, such that the depicted appliance 50 is a side-by-side appliance 50. It is also contemplated that other configurations of the appliance 50 are contemplated including, but not limited to, a stacked configuration.

Referring still to FIGS. 1-3, the refrigeration compartment 80 may include an illumination feature 86 operably coupled to a reed switch 88. The reed switch 88 is communicatively coupled to the first door 56, such that when the first door 56 is in an open position the reed switch 88 activates the illumination feature 86 to distribute light within the refrigeration compartment 80. The reed switch 88 is operably coupled to a front plate 90, which is operably coupled to the base rails 26, described further below. The reed switch 88 is disposed within a gap 92 defined between the base rails 26. The base rails 26 include a first rail 94 and a second rail 96, which may be collectively referred to as the base rails 26, described in more detail below. The front plate 90 is coupled to the mounting wall 30 of each of the base rails 26 and conceals the gap 92 defined between the base rails 26.

With reference now to FIGS. 2-4B the first and second doors 56, 58 are also operably coupled to the mounting walls 30 of the base rails 26 via the hinges 60 coupled to the front plate 90. The nature of the vacuum insulated structure 10 defined by the wrapper 12 and the liner 16 is such that the wrapper 12 and the liner 16 remain free from penetration or direct attachment with other features of the appliance 50. For example, the doors 56, 58 are instead coupled to the vacuum insulated structure 10 via the front plate 90 coupled to the base rails 26 and via a top plate 98 coupled to the top surface 100 of the wrapper 12. Stated differently, the vacuum defined within the insulation cavity 18 is maintained through the coupling of the doors 56, 58 to the front plate 90 and the top plate 98. The top plate 98 can be spot welded to a top surface 100 of the wrapper 12 to minimize potential contact between the top surface 100 of the wrapper 12 and the hinges 60 to mount the doors 56, 58. The placement of the hinges 60 on the top plate 98 and the front plate 90 minimize the strain placed upon the vacuum insulated structure 10 as the doors 56, 58 are instead coupled to the top plate 98 and the base plate 24 via the base rails 26 and front plate 90.

The base rails 26, as mentioned above, include the attachment flanges 28 and the mounting wall 30 to which the front plate 90 is coupled. The base rails 26 each include a support body 110 from which the attachment flanges 28 extend and to which the mounting wall 30 is coupled. The support body 110 includes a bottom portion 112 from which the mounting wall 30 and parallel side portions 114 extend. The attachment flanges 28 are coupled to and generally extend from the side portions 114. The attachment flanges 28 can include a first attachment flange 116 and a second attachment flange 118. The first attachment flange 116 generally extends medially toward a center 120 of the support body 110, and the second attachment flange 118 generally extends laterally away from the support body 110. For example, the second attachment flange 118 of the first rail 94 extends toward the second attachment flange 118 of the second rail 96. Stated differently, the first attachment flange 116 extends toward the second attachment flange 118, and the second attachment flange 118 extends away from the first attachment flange 116. Additionally or alternatively, the first and second attachment flanges 116, 118 may each extend laterally and/or medially relative to the support body 110 of each base rail 26.

With further reference to FIGS. 2-4B, each of the base rails 26 define a front portion 122 and a rear portion 124, such that the base plate 24 is operably coupled to the front portion 122 of the base rails 26. The machine plate 32 is coupled to the rear portion 124 to at least partially define the lower portion 34 of the machine compartment 22, described further below. The base plate 24 is coupled to the first and second attachment flanges 116, 118 via spot welding of a plurality of fasteners 126, described below. The plurality of fasteners 126 extend through apertures 128 defined by the attachment flanges 28. The plurality of fasteners 126 couple the base plate 24 to the front portion 122 of the base rails 26, and the machine plate 32 is coupled to the rear portion 124 to define the lower portion 34 of the machine compartment 22, described below.

Referring now to FIGS. 5-8 and as mentioned above, the wrapper 12 includes the sidewalls 54, the top and bottom surfaces 100, 14, and the rear wall 52. The rear wall 52 of the wrapper 12 defines a curved surface 130 to at least partially define the machine compartment 22. The bottom surface 14 of the wrapper 12 is operably coupled to the base plate 24, described further below. The machine compartment 22 is defined by the curved surface 130 of the wrapper 12 along with the base rails 26 and the machine plate 32. It is generally contemplated that machine components 132 are positioned on the machine plate 32 within the machine compartment 22 beneath the rear wall 52 and proximate to the curved surface 130 of the wrapper 12. For example, the machine components 132 may include, but are not limited to, a compressor 134, a fan 136, and an evaporator 138. The machine components 132 define a collective load $L_1$ on the machine plate 32, which is generally dispersed across the machine plate 32 and the base rails 26, described further below. The load $L_1$ is also dispersed and supported by the connection of the base rails 26 to the base plate 24.

The machine plate 32 is configured to support the machine components 132 within the machine compartment 22 and can be positioned over and coupled to the base rails 26. As mentioned above, the gap 92 is defined between the first and second base rails 94, 96 and the machine plate 32 may at least partially conceal the gap 92 defined between the first and second base rails 94, 96. As mentioned above, the gap 92 may provide passage for the electrical wiring 72 and/or appliance lines 74 of the appliance 50. The gap 92 may also provide passage for the electrical wiring 72 and other connection lines of the machine components 132 to pass between the machine plate 32 and the curved surface 130 and within the gap 92.

As mentioned above, the machine components 132 generally exert the load $L_1$ upon the machine plate 32 based on the gravitational pull on the machine components 132. It is generally contemplated that the load $L_1$ defined by the machine components 132 may account for approximately 30- to 40-percent of the overall weight of the appliance 50. The machine plate 32 is configured to evenly distribute the load $L_1$ of the machine components 132 to the base rails 26. The machine plate 32 can be coupled to the base rails 26 via spot welding to fixedly couple the machine plate 32 with the base rails 26. It is also contemplated that the machine plate 32 can be coupled to the base rails 26 via fasteners, adhesives, screws, or other coupling methods generally known. The load $L_1$ of the machine components 132 is ultimately dispersed along the base rails 26 to minimize the engagement and stress placed upon the vacuum insulated structure 10, as described further below. The base rails 26 may engage the base plate 24 in offsetting the load $L_1$ applied by the machine components 132. The base rails 26 are operably coupled to the base plate 24 via the plurality of fasteners 126, mentioned above.

Referring still to FIGS. 5-8, the wrapper 12 is positioned on and coupled to the base plate 24, which structurally supports the machine components 132 as well as the appliance 50 as a whole. The base plate 24 has a first surface 150 and a second surface 152, such that the first surface 150 defines a perimeter support surface 154 of the base plate 24. The first surface 150 may be defined as an engagement surface, as the first surface 150 is configured to engage and support the insulated structure 10. An aperture 156 can be defined in a central portion 158 of the base plate 24, described further below. The second surface 152 defines a plurality of recesses 160 that are configured to receive the plurality of fasteners 126, described below.

The perimeter support surface 154 of the first surface 150 supports the vacuum insulated structure 10 above the base rails 26, and the base plate 24 is operably coupled to the bottom surface 14 of the wrapper 12 via the perimeter support surface 154. The base plate 24 generally provides added structural base support for the appliance 50 by supporting at least a load $L_2$ of the liner 16 and the wrapper 12. It is also contemplated that the base plate 24 supports the load $L_1$ of the machine components 132 within the machine compartment 22 through the coupled engagement with the base rails 26. The second surface 152 of the base plate 24 may be referred to as an attachment surface, as the second surface 152 is configured to couple the base plate 24 to the base rails 26 via the plurality of fasteners 126, described below.

Referring still to FIGS. 5-8, the base plate 24 is illustrated as defining the aperture 156 in the central portion 158 of the base plate 24. A rib 162 may be defined along the bottom surface 14 of the wrapper 12 that can be at least partially disposed within the aperture 156 defined by the base plate 24. The rib 162 may assist in redistributing the load $L_2$ to the base plate 24 through lateral engagement with the base plate 24 within the aperture 156. The incorporation of the aperture 156 may provide advantageous cost benefits during manufacturing of the appliance 50. Additionally or alternatively, the base plate 24 can be a single piece of material extending along the bottom surface 14 of the wrapper 12. It is generally contemplated that the base plate 24 may be formed from metal. It is also contemplated that the base plate 24 may be formed from a rigid plastic, composite material, or other practicable materials for supporting the loads $L_1$, $L_2$ of the machine components 132 and the liner 16 and the wrapper 12, respectively.

Figure 5:
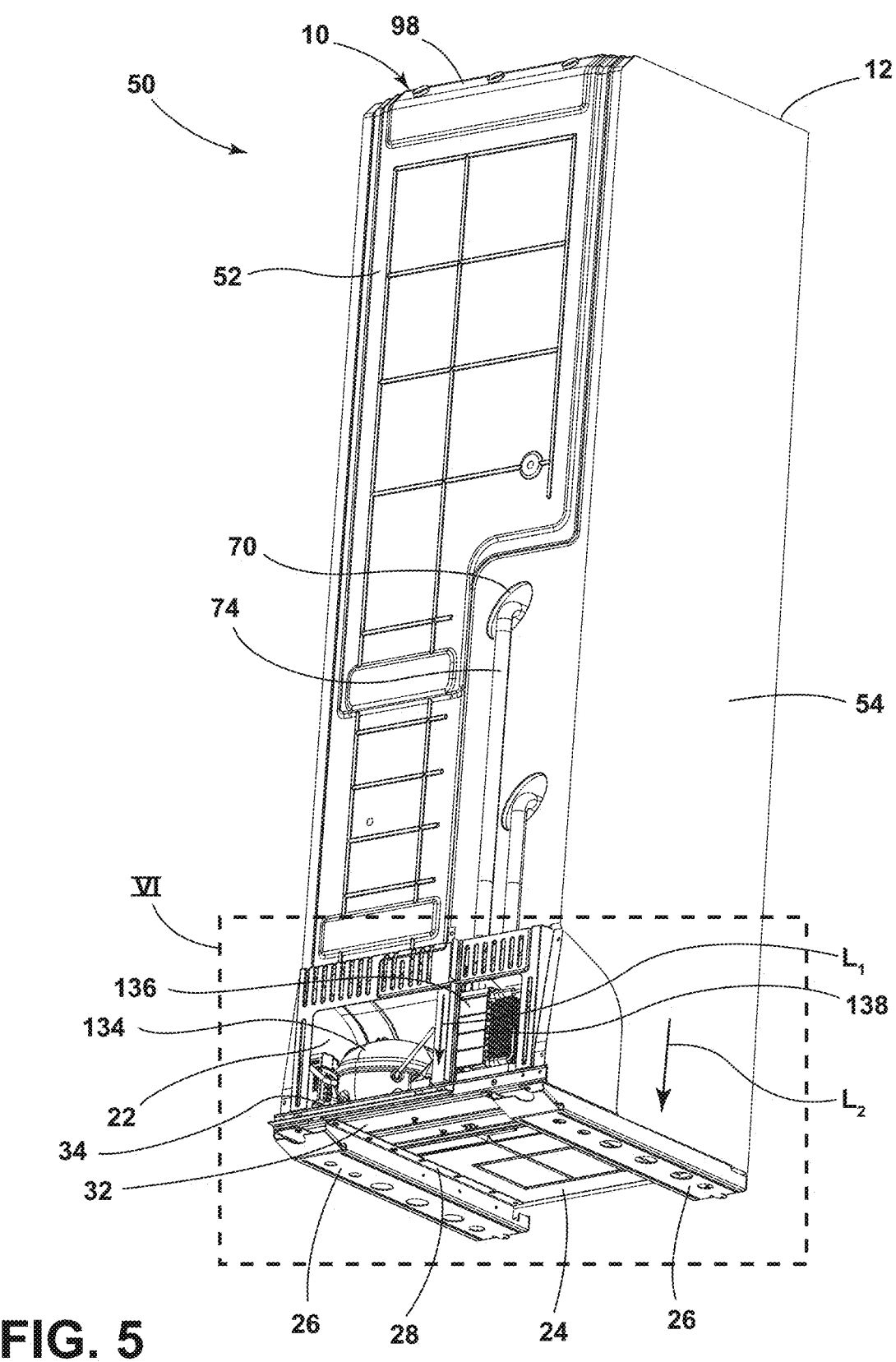
FIG. 5 is a rear perspective view of a machine compartment and base rails of the present disclosure.
Figure 6:
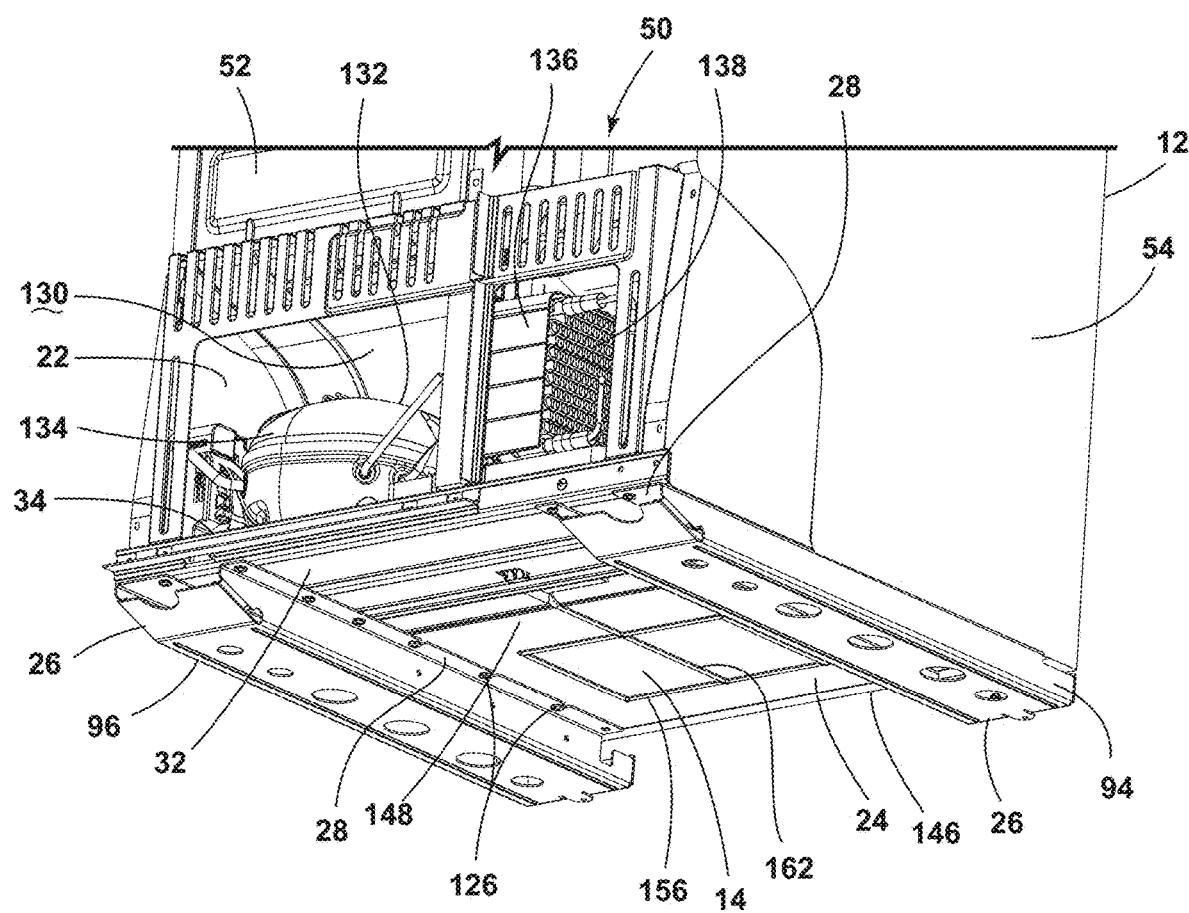
FIG. 6 is an enlarged partial rear perspective view of the machine compartment and base rails of FIG. 5 taken at area VI.
Figure 7:
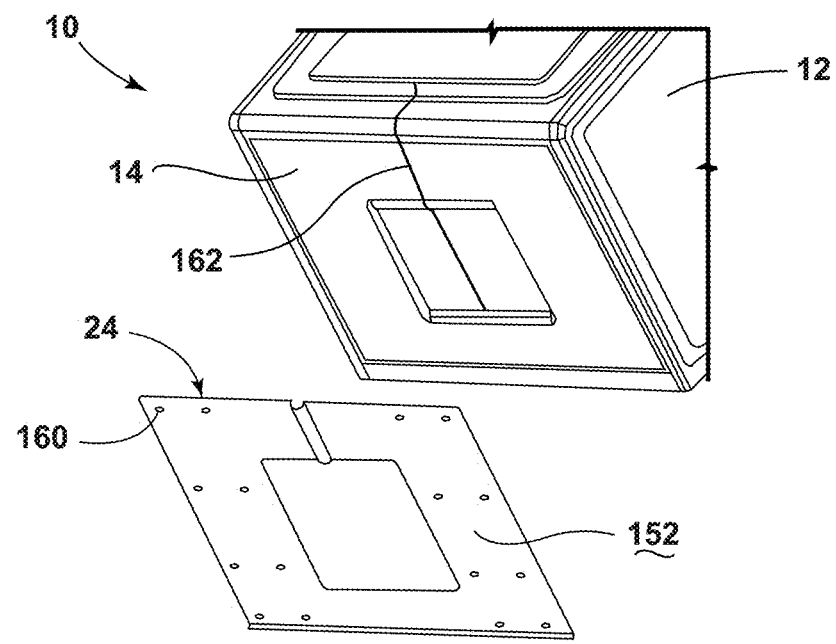
FIG. 7 is a partial bottom perspective view of an insulated structure and a base plate of the present disclosure.
Figure 8:
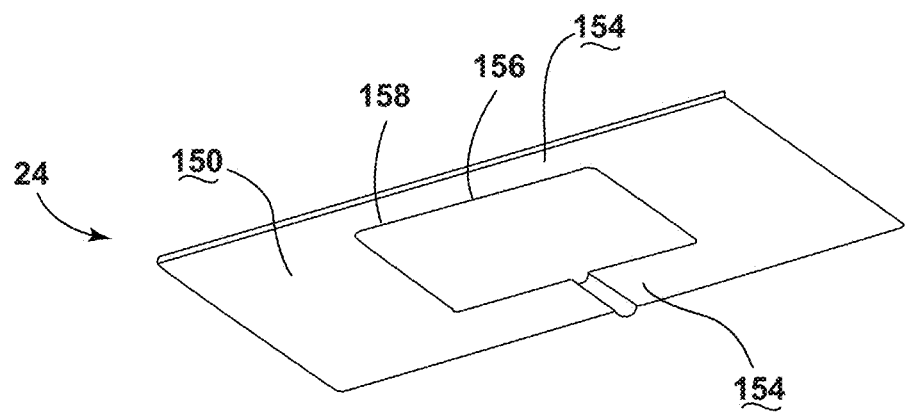
FIG. 8 is a top perspective view of a base plate of the present disclosure.

As illustrated in FIGS. 5 and 6, the base plate 24 at least partially extends over the gap 92 defined between the base rails 26. The extension of the base plate 24 across the gap 92 structurally supports the vacuum insulated structure 10 along the bottom surface 14 of the wrapper 12. The base rails 26 assist in structurally supporting the vacuum insulated structure 10, and the base plate 24 extending over the gap 92 assists in supporting a front edge 146 and a rear edge 148 of the vacuum insulated structure 10.

The base plate 24 is operably coupled to the base rails 26 along the second surface 152. The plurality of fasteners 126 extend from the recesses 160 defined by the second surface 152 to couple to the attachment flanges 28 of the base rails 26 to the base plate 24. As mentioned above, the base rails 26 are positioned proximate to the sidewalls 54 of the wrapper 12 and coupled to the base plate 24. The base rails 26 may at least partially extend beyond the curved surface 130 of the wrapper 12 to lie substantially perpendicular with the rear wall 52 of the wrapper 12. As mentioned above, the base rails 26 are coupled to the machine plate 32 and are configured to assist in distributing the load $L_1$ of the machine components 132 from the machine plate 32 along each of the base rails 26. The base rails 26 may engage the base plate 24 in redistributing the load $L_1$ of the machine components 132. The base plate 24 may cooperate with the base rails 26 to balance the loads $L_1$, $L_2$ of the machine components 132 and the vacuum insulated structure 10, respectively.

Referring again to FIGS. 1-8, the base plate 24 and the base rails 26 are configured to assist in overall load distribution of the appliance 50 to minimize the forces acting upon the vacuum insulated structure 10. The load bearing configuration of the base plate 24 and the base rails 26 minimizes the strain placed on the bottom surface 14 of the wrapper 12, which minimizes potential for outgassing via lapse in structural integrity that may otherwise occur. The base plate 24 is spot welded along the first surface 150 to the bottom surface 14 of the wrapper 12 to avoid penetrating the wrapper 12. Further, the plurality of fasteners 126 are welded to the second surface 152 within the recesses 160 defined along the second surface 152 and then coupled to each of the base rails 26. The attachment flanges 28 of the base rails 26 assist in coupling the base rails 26 to the base plate 24 with minimal additional structural configuration of the support body 110, which helps to minimize overall production and manufacturing costs.

In addition, the mounting walls 30 assist in attachment of the front plate 90 and, ultimately, the doors 56, 58 to the appliance 50 while leaving the vacuum insulated structure 10 free from penetration. The front plate 90 can be coupled directly to the base rails 26 via the mounting wall 30, such that the vacuum insulated structure 10 can remain free from penetration by attachment features, such as the hinges 60. The gap 92 assists in placement of the reed switch 88 within the gap 92 behind the front plate 90 as well as room for other appliance lines 74 to be positioned beneath the vacuum insulated structure 10 between the base rails 26. The front plate 90 also assists in covering and concealing the gap 92 defined between the first and second rails 94, 96. The concealment of the gap 92 by the front plate 90 minimizes the potential for items to be positioned beneath the appliance 50 within the gap 92. For example, the front plate 90 blocks items from being kicked or otherwise repositioned beneath the appliance 50.

The invention disclosed herein is further summarized in the following paragraphs and is further characterized by combinations of any and all of the various aspects described therein.

According to one aspect of the present disclosure, a vacuum insulated structure includes a wrapper that has a bottom surface. A liner is operably coupled to the wrapper and defines an insulation cavity that includes materials. A machine compartment is at least partially defined by the wrapper. A base plate is operably coupled to the bottom surface of the wrapper proximate the machine compartment. Base rails are operably coupled to the base plate and at least partially defines the machine compartment. Each of the base rails include attachment flanges and a mounting wall. A machine plate is operably coupled to the base rails and define a lower portion of the machine compartment.

According to another aspect, a base plate is configured to distribute a load of a wrapper and a liner across the base plate, and the base plate is spot welded to a bottom surface of the wrapper.

According to another aspect, a vacuum insulated structure further includes a front plate that is operably coupled to a mounting wall of each of the base rails, a hinge that is operably coupled to the front plate, and a door that is operably coupled to the front plate via the hinge.

According to another aspect, a vacuum insulated structure further includes a reed switch that is operably coupled to a front plate between each base rail.

According to another aspect, attachment flanges of each of the base rail extend medially toward a central portion of a base plate.

According to another aspect, a base plate includes a first surface and a second surface, and the base plate is coupled to a bottom surface of a wrapper via the first surface and the second surface defines a plurality of recesses in which a plurality of fasteners are disposed.

According to another aspect, base rails, a base plate, and a machine plate are configured to distribute a load that is defined by machine components disposed within a machine compartment and a load of a wrapper and a liner.

According to another aspect of the present disclosure, an insulated structure for an appliance includes a wrapper. A liner is operably coupled to the wrapper. A base plate has a first surface and a second surface. The base plate is operably coupled to the wrapper via the first surface and is configured to distribute a load of the wrapper and the liner. Base rails are operably coupled to the second surface of the base plate. Each of the base rails include a first attachment flange, a second attachment flange, and a mounting wall. A machine compartment is defined by the wrapper and the base rails proximate to the base plate. A machine plate is operably coupled to the first attachment flange and the second attachment flange of each of the base rails and define a lower portion of the machine compartment.

According to another aspect, an insulated structure further includes a front plate that is operably coupled to a mounting wall of each base rail proximate to an opening that is defined by a liner, and a reed switch that is operably coupled to the front plate between the base rails.

According to another aspect, an insulated structure further includes a hinge that is operably coupled to a mounting wall of at least one base rail via a front plate, and a hinge is configured to couple a door to at least one of the base rails via the front plate.

According to another aspect, a gap is defined between base rails, and a front plate extends between and is coupled to each of the base rails to conceal the gap.

According to another aspect, a second surface of a base plate defines a plurality of recesses and includes a plurality of fasteners disposed in each of the plurality of recesses, and the base plate is coupled to the base rails via the plurality of fasteners.

According to another aspect, base rails each define a front portion and a rear portion, and a base plate is coupled to the front portion of each base rail and a machine plate is coupled to the rear portion of the base rails.

According to another aspect, each of the base rails includes a support body, and a first attachment flange extends medially from the support body and a second attachment flange extends laterally from the support body.

According to yet another aspect of the present disclosure, a support assembly for a vacuum insulated structure includes a base plate that has a perimeter support surface and centrally defines an aperture. The base plate includes fasteners that extend outwardly from the base plate. Base rails each include a support body that has a first attachment flange, a second attachment flange, and a mounting wall that is operably coupled to the support body. The first attachment flange and the second attachment flange operably couple each of the base rails to the base plate. A front plate is operably coupled to the mounting wall of each of the base rails. A machine plate is operably coupled to each of the first attachment flange and the second attachment flange of each of the base rails proximate to the base plate.

According to another aspect, a base plate has a first surface and a second surface, and the second surface defines a plurality of recesses in which fasteners are disposed.

According to another aspect, a support body of each base rail has a front portion and a rear portion, and a base plate is operably coupled to the front portion and a machine plate is coupled to the rear portion.

According to another aspect, a gap is defined between base rails, and a front plate is coupled to each of the base rails and is configured to conceal the gap.

According to another aspect, a base plate is coupled to each base rail along a perimeter support surface of the base plate, and at least a portion of the perimeter support surface extends between the base rails.

According to another aspect, a base plate and base rails are configured to distribute a load of said vacuum insulated structure along a perimeter support surface and a support body of each of the base rails, respectively.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

What is claimed is:

1. A vacuum insulated structure, comprising:
a wrapper having a top surface and a bottom surface;
a liner operably coupled to the wrapper and defining an insulation cavity that includes insulation materials;
a machine compartment at least partially defined by the wrapper;
a base plate operably coupled to the bottom surface of the wrapper proximate the machine compartment;
base rails operably coupled to the base plate and at least partially defining the machine compartment, each of the base rails including attachment flanges and a mounting wall, and wherein a machine plate is operably coupled to the base rails and defines a lower portion of the machine compartment;
a front plate operably coupled to the mounting wall of each of the base rails;
a reed switch operably coupled to the front plate between each of the base rails;
a hinge operably coupled to the front plate; and
a door operably coupled to the front plate via the hinge.

2. The vacuum insulated structure of claim 1, wherein the base plate is configured to distribute a load of the wrapper and the liner across the base plate, and wherein the base plate is spot welded to the bottom surface of the wrapper.

3. The vacuum insulated structure of claim 1, wherein the attachment flanges of the base rails extend medially toward a central portion of the base plate.

4. The vacuum insulated structure of claim 1, wherein the base plate includes a first surface and a second surface, and wherein the base plate is coupled to the bottom surface of the wrapper via the first surface and the second surface defines a plurality of recesses in which a plurality of fasteners are disposed.

5. The vacuum insulated structure of claim 1, wherein the base rails, the base plate, and the machine plate are configured to distribute a load defined by machine components disposed within the machine compartment and a load of the wrapper and the liner.

6. An insulated structure for an appliance, comprising:
a wrapper;
a liner operably coupled to the wrapper;
a base plate having a first surface and a second surface, wherein the base plate is operably coupled to the wrapper via the first surface and is configured to distribute a load of the wrapper and the liner;
base rails operably coupled to the second surface of the base plate, each of the base rails including a first attachment flange, a second attachment flange, and a mounting wall, wherein each of the base rails includes a support body, and wherein the first attachment flange extends medially from the support body and the second attachment flange extends laterally from the support body;
a machine compartment defined by the wrapper and the base rails proximate the base plate; and a machine plate operably coupled to the first attachment flange and the second attachment flange of each of the base rails and defining a lower portion of the machine compartment.

7. The insulated structure of claim 6, further comprising:
a front plate operably coupled to the mounting wall of each of the base rails proximate an opening defined by the liner; and
a reed switch operably coupled to the front plate between the base rails.

8. The insulated structure of claim 7, further comprising:
a hinge operably coupled to the mounting wall of at least one of the base rails via the front plate, wherein the hinge is configured to couple a door to at least one of the base rails via the front plate.

9. The insulated structure of claim 7, wherein a gap is defined between the base rails, and wherein the front plate extends between and is coupled to each of the base rails to conceal the gap.

10. The insulated structure of claim 6, wherein the second surface of the base plate defines a plurality of recesses and includes a plurality of fasteners disposed in each of the plurality of recesses, and wherein the base plate is coupled to the base rails via the plurality of fasteners.

11. The insulated structure of claim 6, wherein the base rails each define a front portion and a rear portion, and wherein the base plate is coupled to the front portion of each base rail and the machine plate is coupled to the rear portion of the base rails.

12. A support assembly for a vacuum insulated structure, comprising:
a base plate having a perimeter support surface and centrally defining an aperture, the base plate including fasteners extending outwardly from the base plate;
base rails each including a support body having a first attachment flange, a second attachment flange, and a mounting wall operably coupled to the support body, wherein the first attachment flange and the second attachment flange operably couple each of the base rails to the base plate;
a front plate operably coupled to the mounting wall of each of the base rails; and
a machine plate operably coupled to each of the first attachment flange and the second attachment flange of each of the base rails proximate to the base plate.

13. The support assembly of claim 12, wherein the base plate has a first surface and a second surface, and wherein the second surface defines a plurality of recesses in which the fasteners are disposed.

14. The support assembly of claim 12, wherein the support body of each of the base rails has a front portion and a rear portion, and wherein the base plate is operably coupled to the front portion and the machine plate is operably coupled to the rear portion.

15. The support assembly of claim 12, wherein a gap is defined between the base rails, and wherein the front plate is coupled to each of the base rails and is configured to conceal the gap.

16. The support assembly of claim 12, wherein the base plate is coupled to each of the base rails along the perimeter support surface of the base plate, and wherein at least a portion of the perimeter support surface extends between the base rails.

17. The support assembly of claim 12, wherein the base plate and the base rails are configured to distribute a load of said vacuum insulated structure along the perimeter support surface and the support body of each of the base rails, respectively.

* * * * *